(12) United States Patent
Petersen et al.

(10) Patent No.: US 7,523,441 B2
(45) Date of Patent: Apr. 21, 2009

(54) IMPLEMENTING A SYNCHRONOUS REACTIVE SYSTEM IN A GRAPHICAL PROGRAM

(75) Inventors: Newton G. Petersen, Austin, TX (US); Hugo A. Andrade, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1083 days.

(21) Appl. No.: 10/826,521

(22) Filed: Apr. 16, 2004

(65) Prior Publication Data

US 2005/0235253 A1    Oct. 20, 2005

(51) Int. Cl.
*G06F 9/45* (2006.01)
(52) U.S. Cl. .................................. 717/113
(58) Field of Classification Search ............. 717/113
See application file for complete search history.

(56) References Cited

U.S. PATENT DOCUMENTS 6,539,541 B1 * 3/2003 Geva .................... 717/150
2005/0050515 A1 * 3/2005 Shah et al. ............. 717/113

OTHER PUBLICATIONS

Edwards, Stephen Anthony, *The Specification and Execution of Heterogeneous Synchronous Reactive Systems*, Doctoral Dissertation, University of California, Berkeley, 1997, 170 pages.

* cited by examiner

*Primary Examiner*—John Chavis
(74) *Attorney, Agent, or Firm*—Meyertons Hood Kivlin Kowert & Goetzel, P.C.; Jeffrey C. Hood; Mark S. Williams

(57) ABSTRACT

System and method for implementing a synchronous reactive system in a graphical program. A loop structure is included in the graphical program in response to first user input, and is operable to execute iteratively in a synchronous manner, where the loop structure performs each iteration subject to a time constraint. A plurality of graphical program nodes is included in the loop structure in response to second user input. The loop structure includes at least one synchronization register, comprising an input and an output. During execution of the graphical program, for each iteration, the input to the synchronization register stores the state information for the current iteration, and the output of the synchronization register provides the state information for use in a next iteration of the loop, where the loop structure executes the plurality of graphical program nodes in the loop structure using stored state information from an immediately previous iteration.

33 Claims, 12 Drawing Sheets

IMPLEMENTING A SYNCHRONOUS REACTIVE SYSTEM IN A GRAPHICAL PROGRAM

FIELD OF THE INVENTION

The present invention relates to the field of graphical programming, and more particularly to a system and method for implementing a hardware or software synchronous reactive system in a graphical program.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In parallel with the development of the graphical programming model, embedded systems, e.g., measurement and control systems, have been developed for a wide variety of applications, such as automated manufacturing and remote data collection, among others. The falling cost of hardware has caused both the ubiquity and complexity of these application-specific computing systems to grow, and with more complexity comes a greater need to contain it.

Stephen Edwards' 1997 doctoral dissertation titled "The Specification and Execution of Heterogeneous Synchronous Reactive Systems", describes a model of computation that combines precise control over when things happen with the ability to assemble systems from pieces described in different languages, a way to ameliorate complexity by allowing each piece to use the most suitable language, with a focus on reactive systems, i.e., systems that must respond to their environment at the environment's speed. The synchronous reactive (SR) model of computation facilitates synchronization of events by assuming computation is substantially infinitely fast. In this model of computation time is divided into a sequence of discrete "ticks", and the designer controls the tick in which an action takes place. In general, the term "synchronous" means that events occur on a synchronizing clock tick. The term "reactive" means that the system is able to respond as fast as the environment provides events to process.

As Edwards describes, synchronous systems, e.g., synchronous circuits, discretize time to filter out "time noise" caused by unpredictable, unmatched, and uncontrollable delays. One primary aspect of these systems is the synchronization of outgoing events with incoming events. Synchronous digital circuits generally utilize a periodic global clock signal as a synchronizing input. The synchronous model of time used in SR systems generalizes this concept, such that every signal from the environment is effectively a clock. Output events are synchronized to input events, and so no output events are generated absent some outside stimulus, which provides for great flexibility. For example, as Edwards notes, in general, it is possible to make something happen on the nth occurrence of an event, such as on the tenth second (which requires a periodic "second" input), on the count of three, or on the fifth floor (e.g., for an elevator). Edwards further notes that synchrony relies on the concept of concurrency, which is not generally supported in sequentially executed program languages such as C.

Thus, the SR model of computation assumes (effectively) infinite computation speed, where a system's reaction to an input appears at the same instant as the input. Thus, a system can behave synchronously if it is fast enough, i.e., the system must always finish its current computations before subsequent events arrive, which requires being aware of both the minimum inter-event time and the maximum computation time. Note that the exact performance or speed of a system's components is not an issue as long as it is above a certain threshold. While physically distributed systems with long intra-system communication times may be difficult to make synchronous, for many applications, especially small, embedded systems, synchrony is feasible.

As fast hardware become more affordable, embedded system designs increasingly rely on software. This factor, in combination with cheap fast hardware, allows for greater system complexity, i.e., larger, more powerful systems, which complicates designing and managing the systems. This difficulty may be managed somewhat by extensive simulation, and, to a lesser extent, formal verification; however, implementations of SR systems in traditional programming languages have tended to be complex and unwieldy with respect to design and maintenance.

Thus, improved systems and methods for implementing and representing synchronous reactive systems (SRS) are desired.

SUMMARY OF THE INVENTION

Various embodiments of a system and method for implementing and representing synchronous reactive systems in a graphical program are presented.

First, first user input may be received, e.g., to a graphical user interface (GUI), where the first user input specifies, selects, or otherwise indicates a loop structure for inclusion in a graphical program, and where the loop structure is operable to execute in an iterative manner, storing state information from each iteration and providing that state information for use in the next iteration. In a preferred embodiment, the loop structure is operable to perform each iteration subject to a time constraint, where the loop structure executes the plurality of graphical program nodes in a synchronous reactive manner. In other words, the loop structure may be operable to execute iteratively in a synchronous manner, where the loop structure is operable to store state information for a current iteration and to provide the state information for use in a next iteration of the loop. Note that the state information may include any data or information generated or used by the loop structure, or logic, e.g., graphical program nodes, contained therein.

The specified loop structure may be included in the graphical program in response to the first user input. Note that the graphical program may already be partially created, i.e., may already include some graphical program nodes or elements, or, the loop structure may be the first graphical program element included in the creation process.

Second user input may then be received, where the second user input specifies, selects, or otherwise indicates a plurality of graphical program nodes for inclusion in the loop structure. In one embodiment, the first and/or second user input may include "dragging and dropping" graphical program elements onto a block diagram. For example, the user may select the elements (e.g., the loop structure and/or the graphical program nodes) from one or more palettes of graphical program elements with a pointing device, such as a mouse, and drag the selected elements onto the block diagram, as is well known in the art of graphical user interfaces. Alternatively, the user may select the elements via menus, dialogs, command line, or any other means as desired.

the specified plurality of graphical program nodes may then be included in the loop structure (in the graphical program), in response to the second user input. In other words, in response to the second user input, the selected nodes may be contained within the loop structure, where the nodes implement or represent program functionality to be performed iteratively, subject to some specified time constraint. In one embodiment, further user input may be received configuring one or more of the loop structure and the plurality of graphical program nodes. As mentioned above, in a one embodiment, the user input (e.g., the first and second user input and/or additional user input) may be received to a graphical user interface (GUI), e.g., as part of a graphical program development environment.

The graphical program preferably comprises a plurality of interconnected nodes that visually indicate functionality of the graphical program. Note that the graphical program that includes the loop structure may be created in a variety of different ways. The graphical program may implement a measurement function, e.g., data or image acquisition, data generation, and/or analysis, which is desired to be performed by an instrument. Of course, measurement is but one exemplary application, and use of embodiments of the present invention in any other type of application domain is also contemplated.

Finally, the graphical program may optionally be executed. In one embodiment, executing the graphical program includes executing the loop structure in an iterative manner until a stopping condition obtains. Example stopping conditions may include a specified time lapse, number of iterations, equipment problems or failure, manual override, number of samples acquired or generated, and software conditions or alarms, among others.

Some applications or systems may include multiple synchronous reactive systems, and so there may be a need for multiple loop structures in the graphical program. Thus, in one embodiment, the first user input may further specify one or more additional loop structures in the graphical program, where the one or more additional loop structures are each operable to execute iteratively in a synchronous manner, and where the one or more additional loop structures are each operable to store state information for a current iteration and to provide the state information for use in a next iteration of the loop. Similarly, the second user input may further specify a respective plurality of graphical program nodes for inclusion in each of the one or more additional loop structures. In response to this first and second user input, the one or more additional loop structures may be included in the graphical program, and the respective plurality of graphical program nodes in each of the one or more additional loop structures. As described above, during execution of the graphical program, for each iteration, each of the one or more additional loop structures is operable to execute the respective plurality of graphical program nodes in the loop structure using stored state information from an immediately previous iteration, and wherein each of the one or more additional loop structures performs each iteration subject to a respective time constraint.

In one embodiment, the (or each) loop structure may include a synchronization register for storing and providing the state information. For example, the input to the synchronization register may be operable to store the state information each iteration, and the output of the synchronization register may be operable to provide the stored state information for use in the current iteration. Thus, during execution of the graphical program, executing the loop structure may include, for each iteration, the output of the synchronization register providing the state information for the current iteration, and the input to the synchronization register receiving/storing the state information for use in the next iteration. Thus, in being operable to execute in a synchronous manner, the loop structure is preferably operable to receive an input and to provide an output each iteration. Moreover, in one embodiment, in being operable to receive an input and to provide an output each iteration, the loop structure may be operable to receive the input and to provide the output on a single clock edge.

It should be noted that in various embodiments, the graphical program may implement or represent a synchronous reactive system (SRS) solely in software, solely in hardware, or a combination of both. For example, in the case of a graphical program with a single cycle loop deployed to a target hardware device (e.g., compiled and deployed to an FPGA), described in more detail below, each iteration may be constrained to complete within a single clock cycle of the target device. In other words, each clock cycle, e.g., on each rising edge of the clock, the loop may operate to receive an input, and provide an output.

In one embodiment, the loop structure may correspond to a synchronous reactive hardware circuit, e.g., comprised in a target hardware device, where the input synchronization register and the output synchronization register are implemented by flip flops included in the synchronous reactive hardware circuit. Thus, the synchronization registers preferably map directly to hardware elements in the synchronous reactive hardware circuit, i.e., synchronization registers are preferably simply flip flops, and may connect to pins on the chip containing the circuit.

Alternatively, in the case of a software-only system where the graphical program may execute on a general computer system such as a personal computer or workstation, the loop may be configured to perform each iteration within a specified time period, taking into account, of course, the processing power and speed of the computer system. It should be noted that in the latter case, the system may be expected to receive input and provide output per specified time period, not per clock cycle of the processor, which of course, would be impossible.

It should be noted that in various embodiments, the graphical program may be operable to perform one or more of: an industrial automation function, a process control function, a test and measurement function, a hardware circuit function, and a simulation function, among others.

BRIEF DESCRIPTION OF THE DRAWINGS

A better understanding of the present invention can be obtained when the following detailed description of the preferred embodiment is considered in conjunction with the following drawings, in which.

Figure 1A:
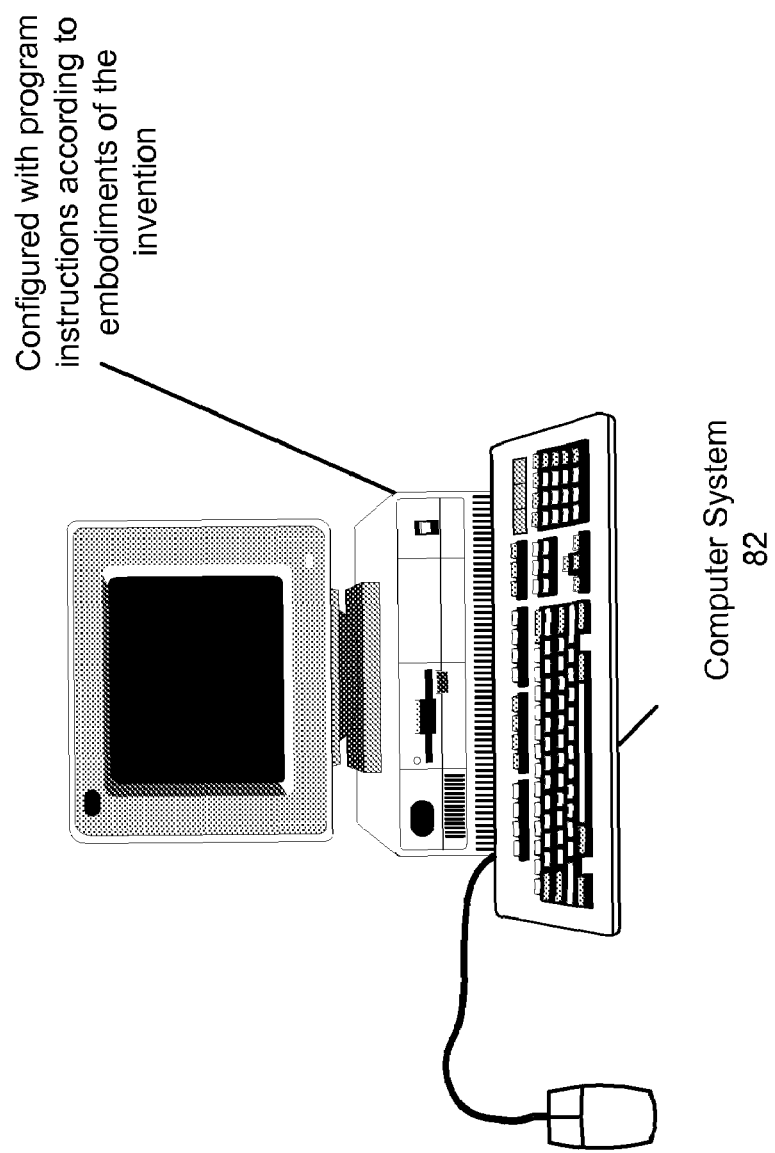
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Converting Graphical Programs Into Hardware Implementations", which issued on Apr. 17, 2001, whose inventors are Jeffrey L. Kodosky, Hugo Andrade, Brian Keith Odom and Cary Paul Butler.

U.S. patent application Ser. No. 10/316,365 titled "Deterministically Handling Asynchronous Events in a Time Triggered System," filed Dec. 11, 2002, whose inventors are James J. Truchard and Brian Keith Odom.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 09/891,571 titled "System and Method for Configuring an Instrument to Perform Measurement Functions Utilizing Conversion of Graphical Programs into Hardware Implementations" filed on Jun. 25, 2001, whose inventors are Jeffrey L. Kodosky, Hugo Andrade, Brian Keith Odom, Cary Paul Butler, and Kevin L. Schultz.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium, where a processor may be any type of computing element, such as a microprocessor, a real time controller, an FPGA, and so forth.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

I/O Hardware—hardware which acquires and/or generates data. The term hardware usually includes physical hardware and I/O names (see Named I/O Points below).

Phantom Hardware—used to refer to hardware that does not actually exist, while hardware that does exist is referred to as real hardware. Non-existent hardware is considered unbound and hardware that represents something real is considered bound. An unbound computing device that is used to apply configurations and execute VIs is called an emulated computing device. Unbound hardware that is used to simulate data acquisition is called simulated hardware.

Named I/O Points—I/O names used by VIs to read data from and write data to hardware. The I/O names are associated with a configuration for one or more devices on how the name is resolved into a read or write operation on the hardware. The configurations of the I/O names are tied to the hardware they abstract, and so they may be created and downloaded like hardware configurations.

Deployment—configurations and VIs that are updated and run on a computing device and its hardware. A VI is said to be deployed when it has been associated with a bound or unbound computing device and updated on that device. Projects may use deployment specifications to remember how the user wants to update and run their application across computing devices.

FIG. 1A—Computer System

FIG. 1A illustrates a computer system 82 configured to implement various embodiments of the present invention. One embodiment of a method for implementing and representing synchronous reactive (SR) systems in a graphical program is described below.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
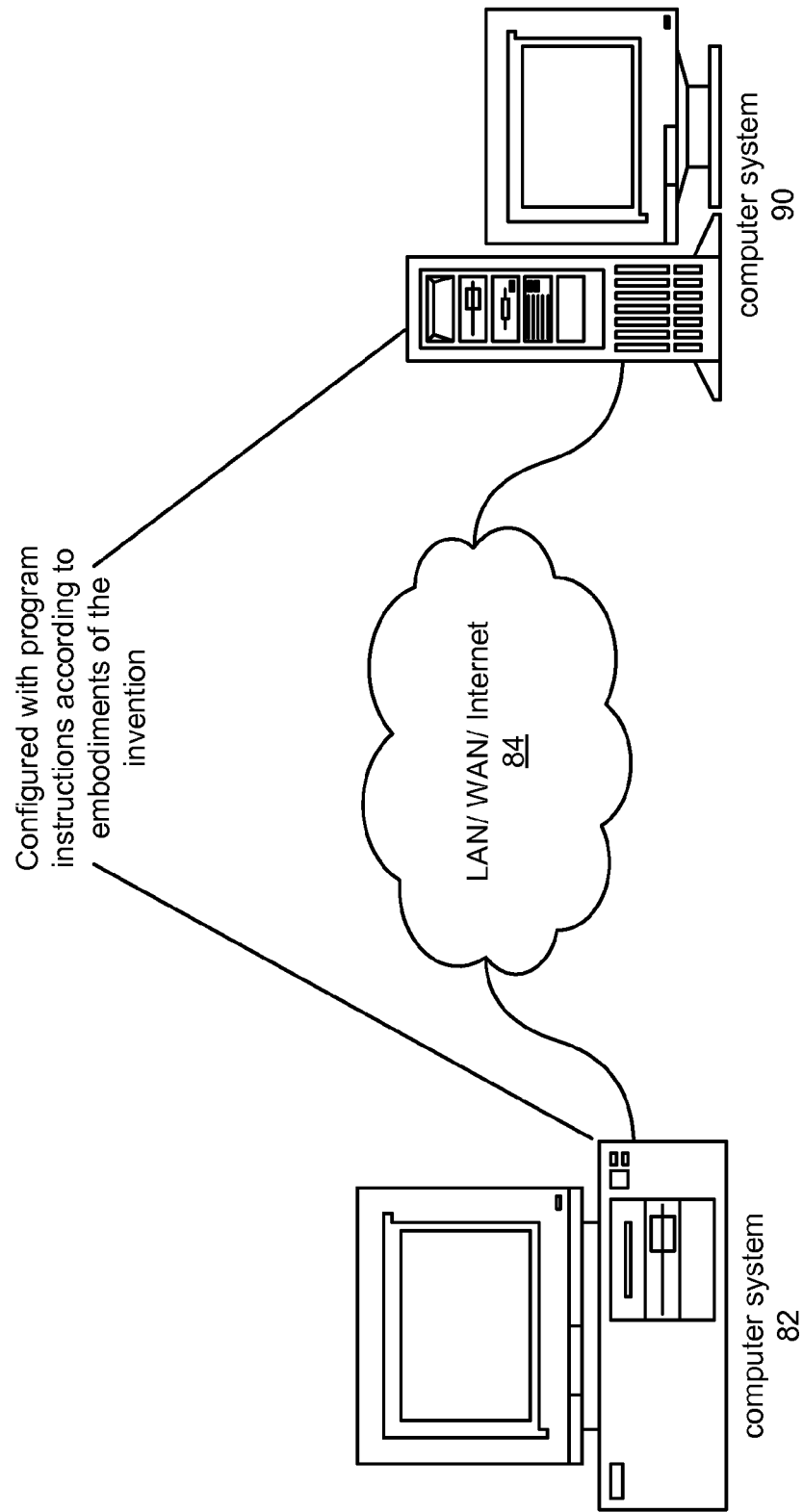
FIG. 1B illustrates a network system comprising two or more computer systems configured to implement an embodiment of the present invention.

FIG. 1B—Computer Network

FIG. 1B illustrates a system including a first computer system 82 that is coupled to a second computer system 90, where the computers systems are configured to implement embodiments of the present invention. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
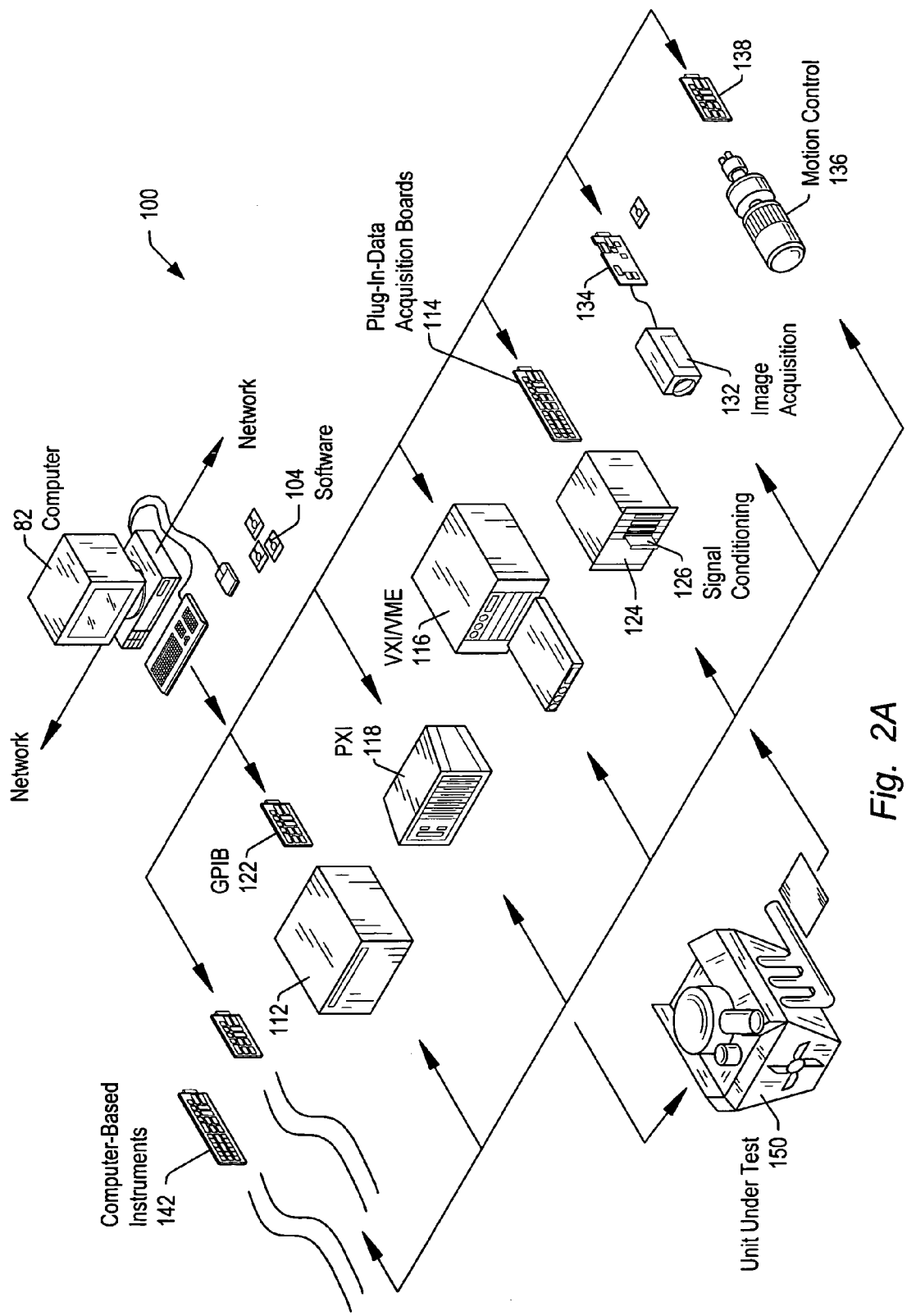
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
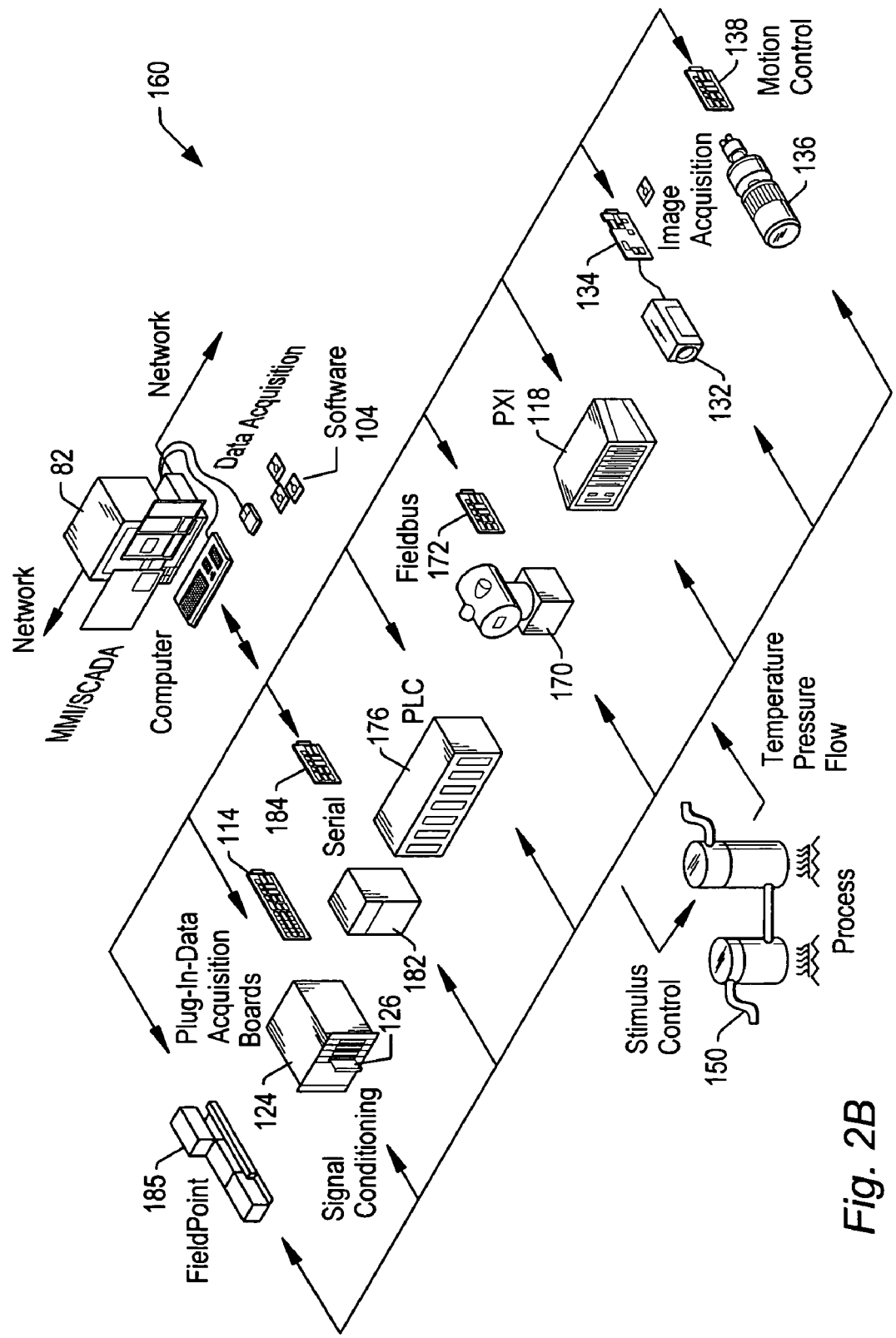
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
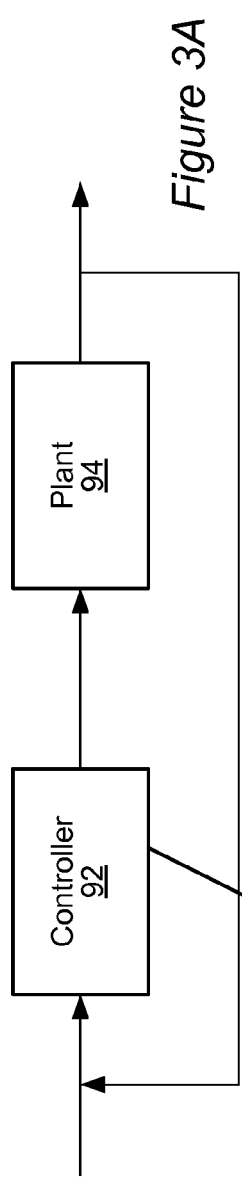
FIG. 3A is a high level block diagram of an exemplary system configured to execute or utilize graphical programs, according to one embodiment.

FIG. 3A is a high level block diagram of an exemplary system configured to execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
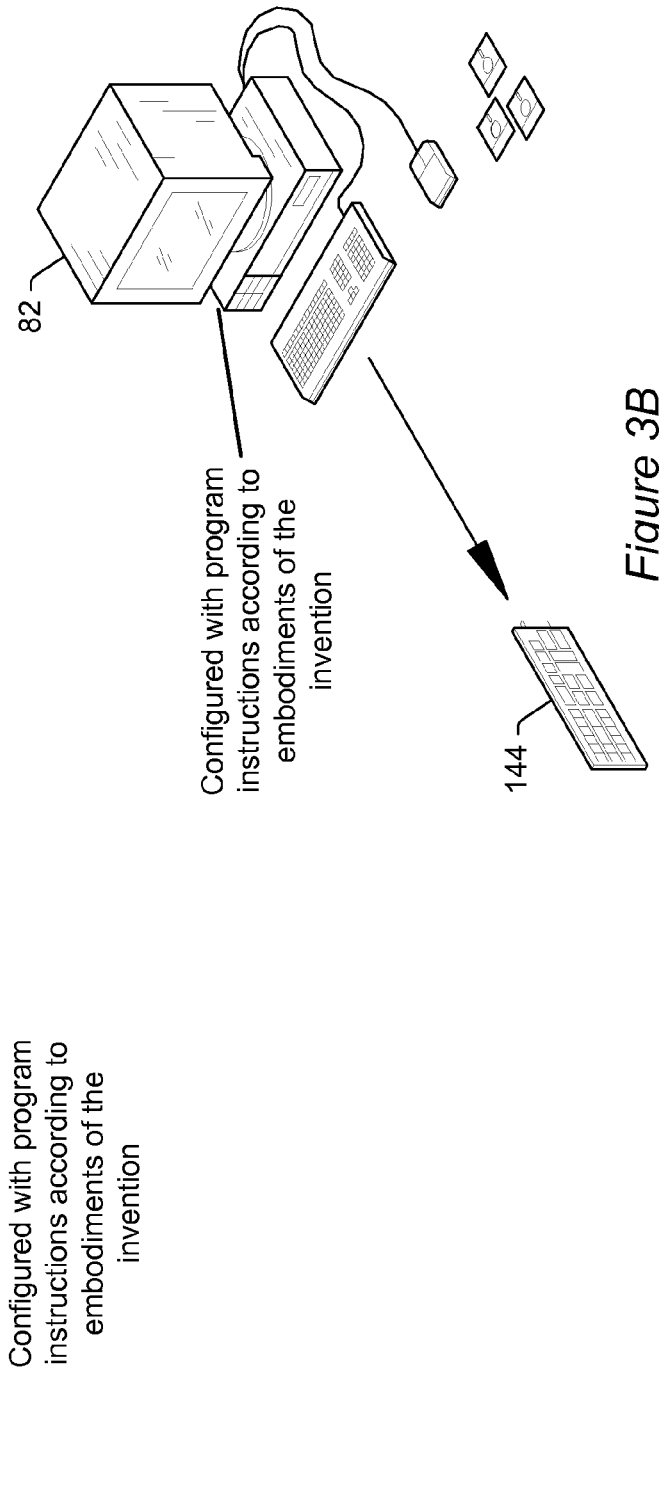
FIG. 3B illustrates an exemplary system configured to perform control and/or simulation functions utilizing graphical programs, according to one embodiment.

FIG. 3B illustrates an exemplary system configured to perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
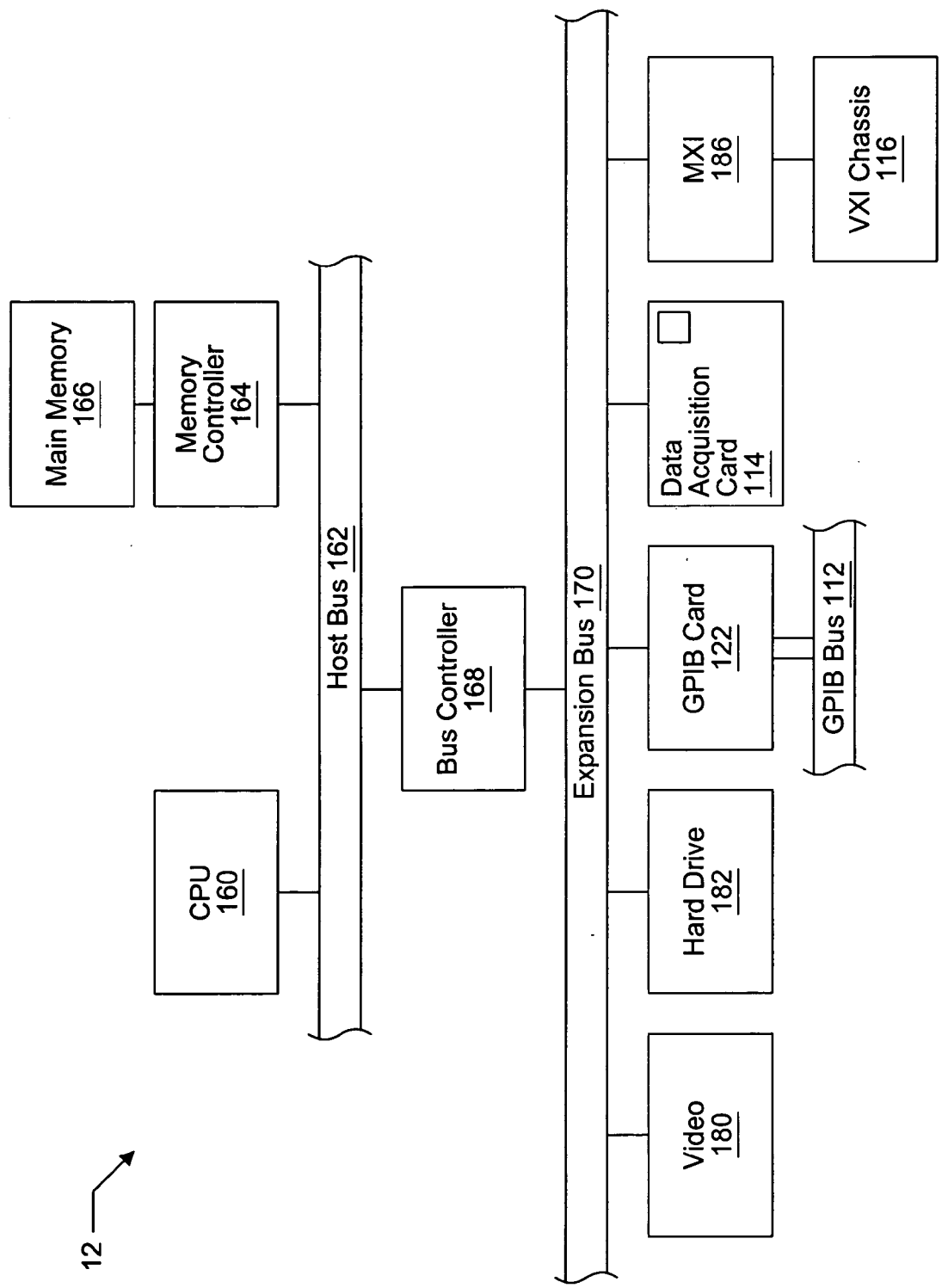
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more programs implementing the present invention, as well as the graphical program(s) operated on by and resulting from the processes described herein, as well as a graphical programming development environment application used to create and/or execute such graphical programs. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
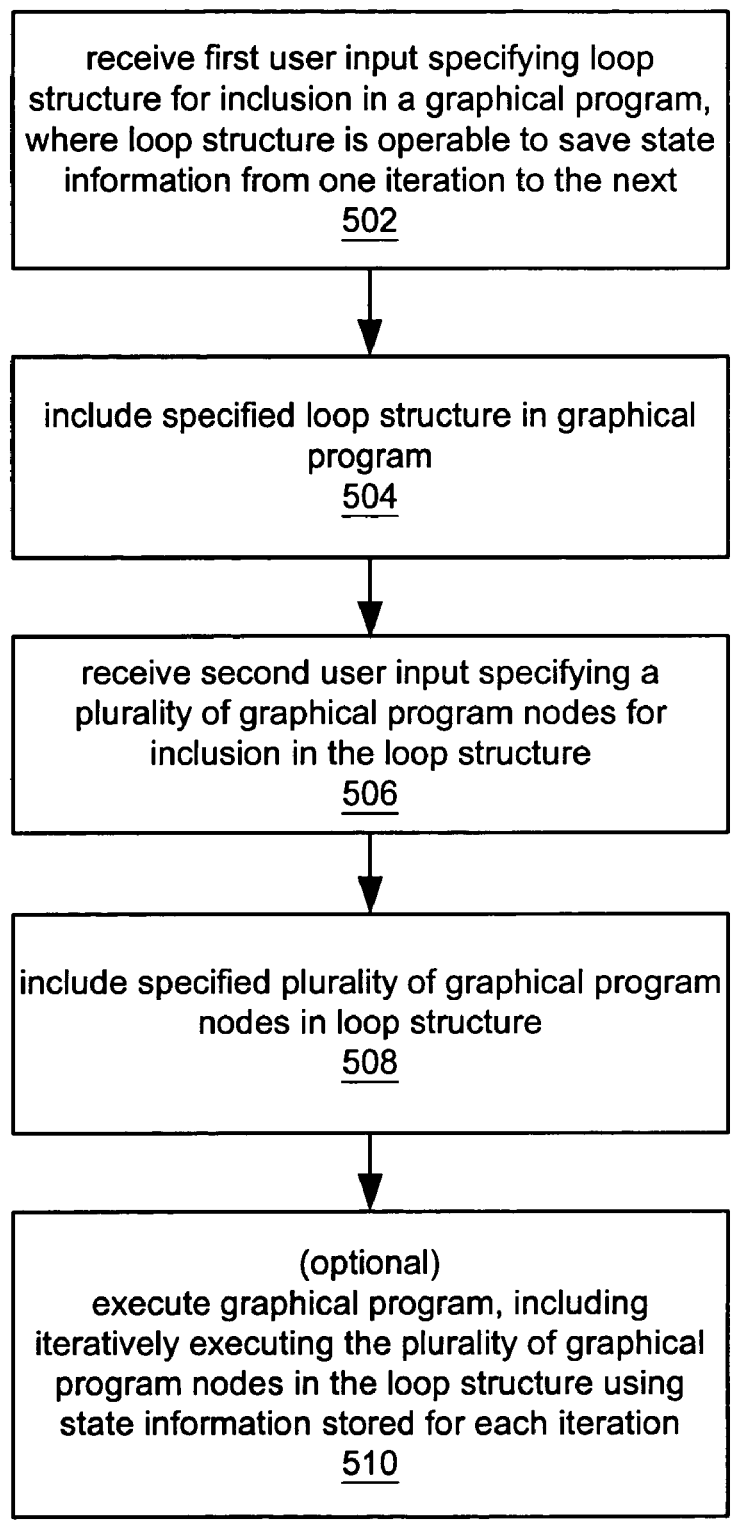
FIG. 5 is a flowchart diagram illustrating one embodiment of a method for implementing a synchronous reactive system in a graphical program.

FIG. 5—Flowchart of a Method for Implementing Synchronous Reactive Systems in a Graphical Program FIG. 5 illustrates a method for implementing a synchronous reactive system in a graphical program. The method shown in FIG. 5 may be used in conjunction with any of the computer systems or devices shown in the above Figures, among other devices. In various embodiments, some of the steps shown may be performed concurrently, in a different order than shown, or may be omitted. Additional steps may also be performed as desired. As shown, this method may operate as follows.

First, in step 502, first user input may be received, e.g., to a graphical user interface (GUI), where the first user input specifies, selects, or otherwise indicates a loop structure for inclusion in a graphical program, and where the loop structure is operable to execute in an iterative manner, storing state information from each iteration and providing that state information for use in the next iteration. In a preferred embodiment, the loop structure is operable to perform each iteration subject to a time constraint, where the loop structure executes the plurality of graphical program nodes in a synchronous reactive manner. In other words, the loop structure may be operable to execute iteratively in a synchronous manner, where the loop structure is operable to store state information for a current iteration and to provide the state information for use in a next iteration of the loop. Note that the state information may include any data or information generated or used by the loop structure, or logic, e.g., graphical program nodes, contained therein.

In 504, the specified loop structure may be included in the graphical program in response to the first user input. Note that the graphical program may already be partially created, i.e., may already include some graphical program nodes or elements, or, the loop structure may be the first graphical program element included in the creation process.

As shown, in step 506, second user input may be received, where the second user input specifies, selects, or otherwise indicates a plurality of graphical program nodes for inclusion in the loop structure. In one embodiment, the first and/or second user input may include "dragging and dropping" graphical program elements onto a block diagram. For example, the user may select the elements (e.g., the loop structure and/or the graphical program nodes) from one or more palettes of graphical program elements with a pointing device, such as a mouse, and drag the selected elements onto the block diagram, as is well known in the art of graphical user interfaces. Alternatively, the user may select the elements via menus, dialogs, command line, or any other means as desired.

In step 508, the specified plurality of graphical program nodes may be included in the loop structure (in the graphical program), in response to the second user input. In other words, in response to the second user input, the selected nodes may be contained within the loop structure, where the nodes implement or represent program functionality to be performed iteratively, subject to some specified time constraint.

In one embodiment, further user input may be received configuring one or more of the loop structure and the plurality of graphical program nodes. As mentioned above, in a one embodiment, the user input (e.g., the first and second user input and/or additional user input) may be received to a graphical user interface (GUI), e.g., as part of a graphical program development environment. Exemplary embodiments of such GUIs are described below with reference to FIGS. 8 and 11, although it should be noted that the GUIs shown and described are for example only, and are not intended to limit the GUIs to any particular form, function, or appearance.

As mentioned above, in a preferred embodiment, the graphical program comprises a plurality of interconnected nodes that visually indicate functionality of the graphical program. Note that the graphical program that includes the loop structure may be created in a variety of different ways. For example, the graphical program may be created on the computer system 82 (or on a different computer system). The graphical program may be created or assembled by the user arranging on a display a plurality of nodes or icons and then interconnecting the nodes to create the graphical program. Thus, the second user input comprises arranging the plurality of nodes on a display, and interconnecting the plurality of nodes. In response to the user assembling the graphical program, data structures may be created and stored which represent the graphical program. The nodes may be interconnected in one or more of a graphical data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function, e.g., data or image acquisition, data generation, and/or analysis, which is desired to be performed by the instrument. Of course, as mentioned above, measurement is but one exemplary application, and use of embodiments of the present invention in any other type of application domain is also contemplated.

Finally, in 510, the graphical program may optionally be executed. In one embodiment, executing the graphical program includes executing the loop structure in an iterative manner until a stopping condition obtains. Example stopping conditions may include a specified time lapse, number of iterations, equipment problems or failure, manual override, number of samples acquired or generated, and software conditions or alarms, among others.

Some applications or systems may include multiple SRSs, and so there may be a need for multiple loop structures in the graphical program. Thus, in one embodiment, the first user input may further specify one or more additional loop structures in the graphical program, where the one or more additional loop structures are each operable to execute iteratively in a synchronous manner, and where the one or more additional loop structures are each operable to store state information for a current iteration and to provide the state information for use in a next iteration of the loop. Similarly, the second user input may further specify a respective plurality of graphical program nodes for inclusion in each of the one or more additional loop structures. In response to this first and second user input, the one or more additional loop structures may be included in the graphical program, and the respective plurality of graphical program nodes in each of the one or more additional loop structures. As described above, during execution of the graphical program, for each iteration, each of the one or more additional loop structures is operable to execute the respective plurality of graphical program nodes in the loop structure using stored state information from an immediately previous iteration, and wherein each of the one or more additional loop structures performs each iteration subject to a respective time constraint.

In one embodiment, the (or each) loop structure may include a synchronization register for storing and providing the state information. For example, the input to the synchronization register may be operable to store the state information each iteration, and the output of the synchronization register may be operable to provide the stored state information for use in the current iteration. Thus, during execution of the graphical program, executing the loop structure may include, for each iteration, the output of the synchronization register providing the state information for the current iteration, and the input to the synchronization register receiving/storing the state information for use in the next iteration. Thus, in being operable to execute in a synchronous manner, the loop structure is preferably operable to receive an input and to provide an output each iteration. Moreover, in one embodiment, in being operable to receive an input and to provide an output each iteration, the loop structure may be operable to receive the input and to provide the output on a single clock edge.

It should be noted that in various embodiments, the graphical program may implement or represent a synchronous reactive system solely in software, solely in hardware, or a combination of both. For example, in the case of a graphical program with a single cycle loop deployed to a target hardware device (e.g., compiled and deployed to an FPGA), described in more detail below, each iteration may be constrained to complete within a single clock cycle of the target device. In other words, each clock cycle, e.g., on each rising edge of the clock, the loop may operate to receive an input, and provide an output.

In one embodiment, the loop structure may correspond to a synchronous reactive hardware circuit, e.g., comprised in a target hardware device, where the input synchronization register and the output synchronization register are implemented by flip flops included in the synchronous reactive hardware circuit. Thus, the synchronization registers preferably map directly to hardware elements in the synchronous reactive hardware circuit, i.e., synchronization registers are preferably simply flip flops, and may connect to pins on the chip containing the circuit. A simple example of this type of SRS is described below with reference to FIGS. 6A-6C.

Alternatively, in the case of a software-only system where the graphical program may execute on a general computer system such as a personal computer or workstation, the loop may be configured to perform each iteration within a specified time period, taking into account, of course, the processing power and speed of the computer system. It should be noted that in the latter case, the system may be expected to receive input and provide output per specified time period, not per clock cycle of the processor, which of course, would be impossible.

In some embodiments, e.g., in software only versions, the I/O functionality or nodes may be placed or configured on the boundaries of the timed loop, e.g., on the left or right edges of the loop structure, in which case the location or origins of any side effects may be clear.

In many prior art systems where respective portions of a program are to be deployed in hardware and software, a diagram for the hardware part (FPGA) and a separate diagram for the software (host) are developed separately, i.e., two targets are identified in the system with corresponding diagrams, and optimizations made locally to these implementations, perhaps with some knowledge of the fact that there may be interactions between the two targets. For example, if it is known that the host interface interacts with a memory mapped target, register accesses to that second target may be optimized, e.g., in the communication between multiple computing elements. Similar optimizations may be made between computing elements and I/O nodes. Note that computing elements and I/O nodes may represent either hardware or software. In other words, optimization may generally be limited to the interface between the targets.

In one embodiment of the present invention, optimizations may be made across these targets in the system, i.e., based not only on the interfaces between the targets, but by considering the two diagrams as one larger system diagram.

It should be noted that in various embodiments, the graphical program may be operable to perform one or more of: an industrial automation function, a process control function, a test and measurement function, and a simulation function, among others.

Figure 6A:
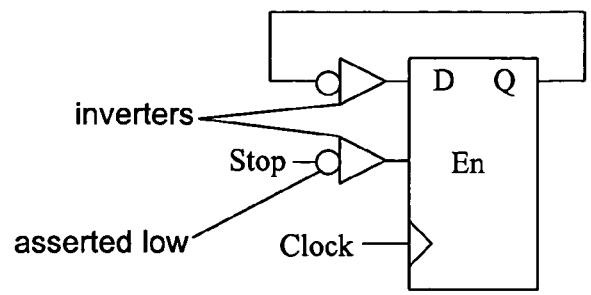
FIGS. 6A illustrates an example synchronous reactive circuit, according to one embodiment.
Figure 6B:
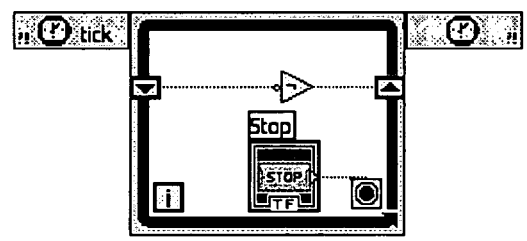
FIGS. 6B illustrates a single cycle loop structure, according to one embodiment.
Figure 6C:
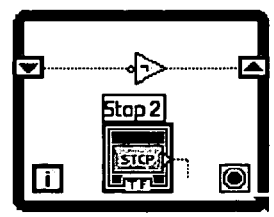
FIGS. 6C illustrates a loop structure, according to the prior art.

FIGS. 6A-6C—A Simple Synchronous Reactive System

FIGS. 6A-6C illustrate several representations of a simple synchronous reactive system (SRS). More specifically, FIG. 6A is a high level schematic of the simple SRS, FIG. 6B is a block diagram of one embodiment of a graphical program implementing the SRS of FIG. 6B, and FIG. 6C is an alternative graphical program implementation of the SRS of FIG. 6B, according to one embodiment. It should be noted that the SRS shown in FIGS. 6A-6C is meant to be exemplary only, and is not intended to represent a "real world" SRS. However, the simple system shown serves to illustrate some of the primary features and aspects of the present invention, according to one embodiment.

As the schematic of FIG. 6A shows, the SRS, in this example, a D flip flop, receives a clock signal, labeled "Clock", for synchronous operation of the system, and a stop enable input, labeled "Stop", for terminating the iterative process, as well as input D, which, as FIG. 6A shows, is actually output Q from the directly previous iteration. As also shown, inputs for D and the stop enable input each include an inverter, e.g., a NOT gate that simply inverts the input. In other words, the inverter represents any logical expression that can change the state of the flip flops. In a preferred embodiment of the single cycle loop, the NOT gate inside the loop along with any other logic in the loop is pure combinatorial logic, in that if the logic is not purely combinatorial, the loop cannot execute every clock cycle. However, this constraint may be relaxed in the case of N-cycle loops or with pipelined logic, described below. Note that the stop signal is inverted before feeding the enable on the flip flop because the loop is executing while the flip flop is enabled and is stopped when the flip flop is not enabled.

Every rising edge of the clock signal, the value of input D is latched as output Q, which is then fed back as input on the next rising edge of the clock, and inverted, to produce a new value of D/Q, which in this case is an inversion of the previous value. In other words, Q becomes D on a clock edge. Thus, output Q is effectively a digital signal with half the frequency of the clock signal, where the SRS receives an input and produces an output every clock cycle.

FIG. 6B illustrates one embodiment of a graphical program, specifically, a loop structure, implementing the SRS of FIG. 6A. As FIG. 6B shows, left and right sides of the loop structure include a synchronization register, signified by a small downward pointing triangle on the left, and a small upward pointing triangle on the right. As shown, a dotted line or wire coupling the synchronization register includes an inverter (asserted low), which receives input from the left side of the register, inverts the signal, and transmits the inverted signal to the right side of the register. The left side of the register corresponds to the Q output of a flip flop and the right side corresponds to the D input of a flip flop as previously discussed.

As FIG. 6B also shows, in this example, the loop structure contains a loop continuation terminal, labeled "stop", whereby iterative processing of the loop structure may be terminated. In the embodiment shown, tabs or elements are included in the upper left and right corners of the loop structure, labeled with small clock icons, to indicate that the loop is not a standard while loop (see FIG. 6C, described below), e.g., that it executes every 'tick' or cycle. In one embodiment, these tabs may be used, e.g., via clicking with a mouse or other pointing device, to invoke one or more configuration panels for configuring the loop structure, examples of which are described below. In other words, the tabs may function as a user interface for configuring the loop structure.

Thus, the graphical program of FIG. 6B is equivalent to, and implements, the SRS of FIG. 6A. Note that the synchronization register maps to flip flops enabled by the loop continuation condition. In other words, if the loop continuation terminal is not wired the flip flops are always enabled and the loop will run perpetually. Because the loop structure of FIG. 6B is constrained to execute each iteration in a single clock cycle, it may be referred to as a single cycle loop.

Note that in general, a flip flop is a hardware component for saving state from one clock cycle to the next, thus, via the loop structure disclosed herein, a flip flop is modeled using a single cycle timed loop.

In one embodiment, the loop structure illustrated in FIG. 6B may have the same dataflow execution as a standard while loop, such as the prior art LabVIEW while loop illustrated in FIG. 6C. As FIG. 6C shows, the only visual difference between the while loop of FIG. 6C and the single cycle loop of FIG. 6B is the omission of the tabs or elements in the upper corners whereby a configuration dialog may be invoked. Thus, the while loop of FIG. 6C will produce the same results as the single cycle loop; however, the single cycle loop guarantees single cycle performance.

Note that in the loop of FIG. 6C, the synchronization register value inverts every loop iteration, however, an iteration is not guaranteed to be a clock cycle. This guarantee is important in a synchronous reactive system. Additionally, the controller for this loop must in general be more complex than that of the loop of FIG. 6B, and hence in general less efficient, because it does not map directly to low level hardware components.

A primary aspect of the present invention is that state information from one iteration to the next is stored in flip flops that stop executing (passing data from input to outputs on clock edges) when the stop condition for the loop is reached. Loops are generally thought of in a sequential software sense, whereas some embodiments of the present invention have a direct mapping to a hardware construct, namely, flip flops.

Thus, in one embodiment, the loop structure may comprise a single-cycle loop, where in being operable to execute in a synchronous manner, the loop structure is operable to iterate each clock cycle. The single cycle timed loop is thus a novel representation for synchronous reactive circuits, specifically flip flops and the logic that feeds those flip flops.

Note that data are stored in flip flops in hardware, and in memory locations in software. The graphical program (e.g., LabVIEW) representation for these storage elements are LabVIEW shift registers which in this document are referred to as synchronization registers. The general synchronous reactive descriptions provided herein apply to both software and hardware based embodiments.

Figure 7A:
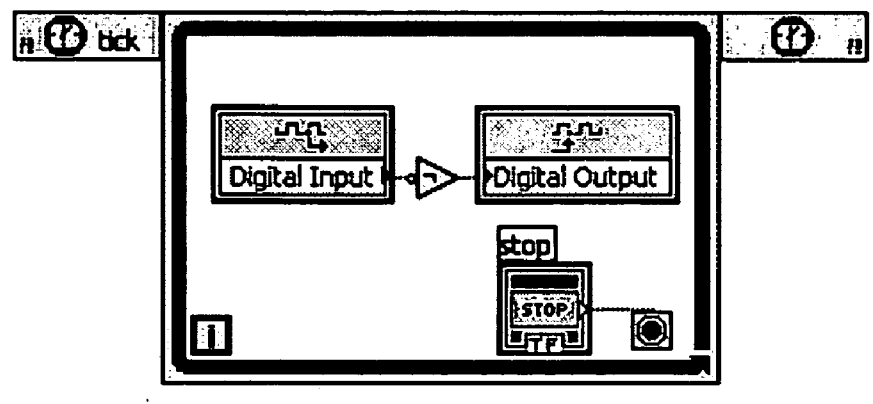
FIGS. 7A and 7B illustrate further example implementations of synchronous reactive systems, according to one embodiment.
Figure 7B:
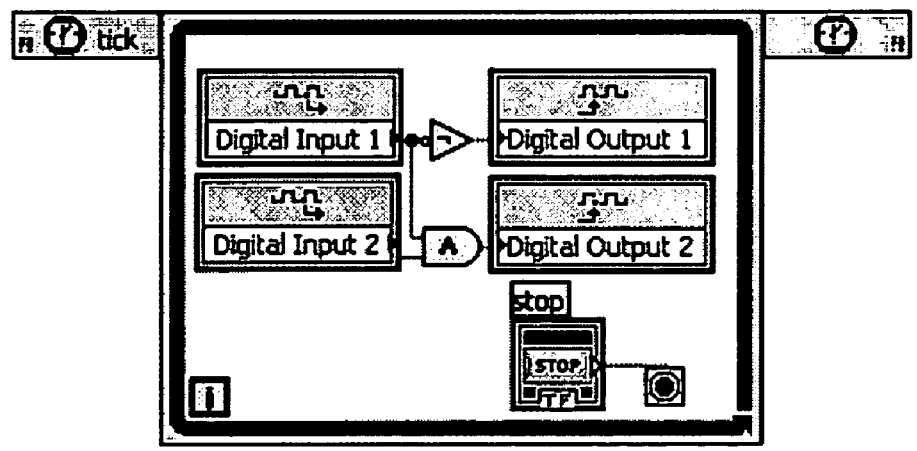

FIGS. 7A-7B—Another Example of a Simple Synchronous Reactive System

FIGS. 7A and 7B illustrate embodiments of graphical programs implementing further examples of single cycle synchronous reactive systems. As FIG. 7A shows, the graphical program includes a single cycle loop structure, similar to that described above with reference to FIG. 6B. As mentioned above, the single cycle loop structure implements the synchronous reactive system by guaranteeing a response in a single clock cycle. As the embodiment of FIG. 7A shows, digital inputs and digital outputs may be placed in the loop, where every clock cycle a new 'event' or value may be input from the outside world, and a new 'event' or value may be output to the outside world, where, for example, the "outside world" may be an external system or device, or simply other graphical programs or graphical program elements in an encompassing graphical program, among others. In the example graphical program of FIG. 7A, an inverter (asserted low) is interposed between a digital input, labeled "Digital Input", and a digital output, labeled "Digital Output", and thus a new digital input value is inverted and output every clock cycle.

The synchronous aspects of the loop structure are particularly important when considering parallel execution of program elements. FIG. 7B illustrates an example graphical program where two digital inputs and two digital outputs execute in parallel. In this embodiment, the inputs are synchronized to the same clock tick, as are the two digital outputs. Thus, the inputs and the outputs may occur at substantially the same instant in time. This type of synchronous operation is generally considered to be good design practice.

As FIG. 7B shows, in this example digital output 1 is effectively the same as the digital output of FIG. 7A, but digital output 2 is a result of "and"-ing the two digital inputs.

As noted above, in some embodiments, the graphical program implementing a synchronous reactive system may be targeted and deployed to a hardware device, e.g., an embedded device for execution. For example, in embodiments where the hardware device includes a programmable hardware element, e.g., an FPGA, deploying the graphical program to a hardware device for execution may include compiling the graphical program to generate a hardware configuration program, and deploying the hardware configuration program to the programmable hardware element, after which, the program may be executed by the hardware device.

Figure 8:
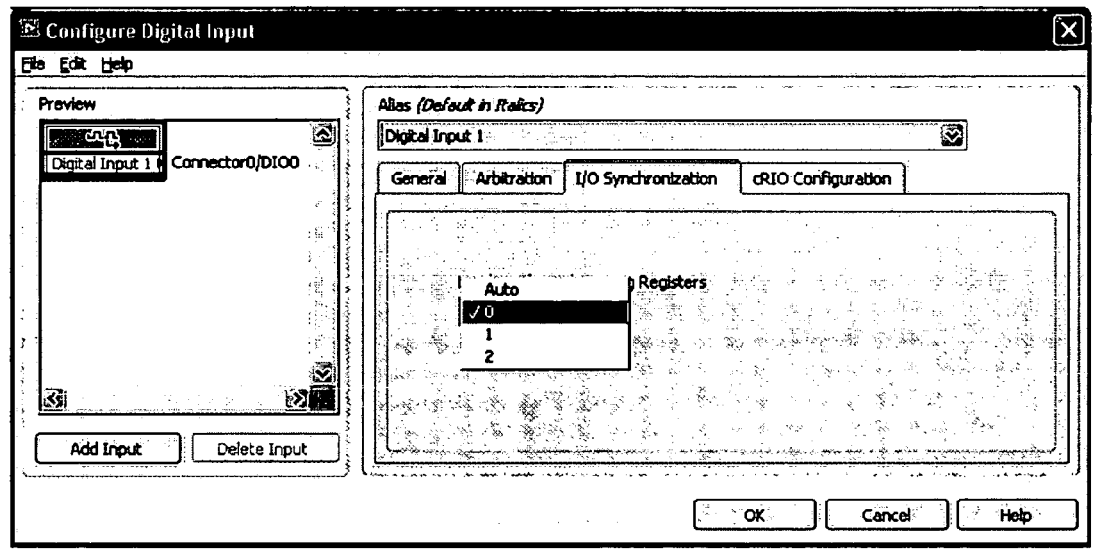
FIG. 8 illustrates one embodiment of a graphical user interface for configuring input to a loop structure.

FIG. 8—GUI for Configuring Input to the Loop Structure

In one embodiment, the user may be able to specify that the loop structure be reactive, but not necessarily synchronous. In other words, the user may be allowed to specify a purely reactive system by omitting synchronization registers from the input and output, e.g., by not specifying synchronization or time constraints for the iterative processing of the logic inside the loop structure. In one embodiment, this may be accomplished by including a feature in I/O nodes that converts the logic between I/O points (the input and output points of the loop) such that no synchronization registers are included. Thus, in embodiments where the graphical program is deployed to an FPGA, no synchronization registers may be implemented, and the program will operate asynchronously, and as fast as possible. Note, however, that this asynchronous operation may result in anomalous behaviors and/or errors, e.g., glitches, ambiguous or metastable results, data collisions, incorrect outputs, and so forth, due to the fact that data or process contingencies normally managed by synchronization processes may not be accommodated or handled correctly.

Thus, in one embodiment, a purely reactive system may be specified and implemented in a graphical program, by receiving first user input specifying a loop structure for inclusion in the graphical program, where the loop structure is operable to execute iteratively, and where the loop structure is operable to store state information for a current iteration and to provide the state information for use in a next iteration of the loop. The loop structure may then be included in the graphical program in response to the first user input. Second user input specifying a plurality of graphical program nodes for inclusion in the graphical program may then be received, and the plurality of graphical program nodes included in the loop structure in response to the second user input. During execution of the graphical program, for each iteration, the loop structure may be operable to execute the plurality of graphical program nodes in the loop structure using stored state information from an immediately previous iteration.

FIG. 8 illustrates one embodiment of a GUI for configuring input for the loop structure, specifically, for configuring digital input. As FIG. 8 shows, fields may be included in the GUI for selecting, adding, and removing inputs, and for specifying synchronization registers for use with respect to the input, among other configuration parameters. Note that in the example shown, the user has selected "zero" registers, and so the resulting configured system may be a reactive system, instead of a synchronous reactive system proper. Note also, that if this configuration were applied to the parallel system of FIG. 7B, the digital outputs may not change at the same instant in time because of different combinatorial logic delays inherent in the different signal paths of the two outputs.

Figure 9:
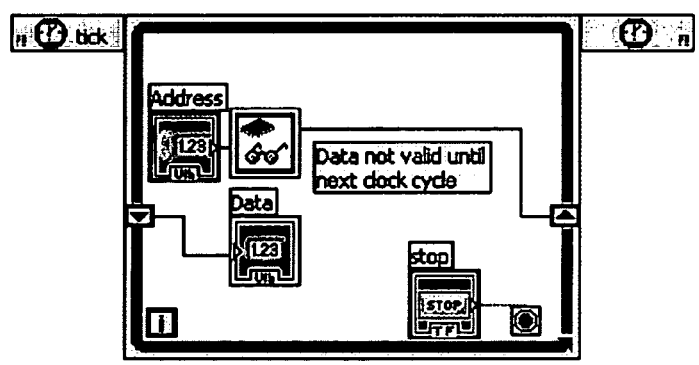
FIG. 9 illustrates an embodiment of a loop structure implementing a synchronous reactive system with embedded synchronization registers.

FIG. 9—Embedded Synchronization Registers

In some embodiments, one or more of the graphical program nodes may correspond to hardware components that already include one or more synchronization registers, referred to as embedded synchronization registers, and so corresponding flip flops need not be re-implemented on the loop borders.

One situation where the above may apply is when the nodes or program elements included in the loop structure are connected such that they have an initial N cycle latency, but can then produce output every clock cycle, referred to as a pipeline of depth N. In one approach to this issue, nodes representing components with embedded synchronization registers may be denoted as such, and their respective outputs wired, either manually or programmatically, to an uninitialized synchronization register to indicate that the output corresponding to a particular input is not valid until the next clock cycle, or, in the case of N-cycle loops, N clock cycles later.

Thus, in one embodiment, including the plurality of graphical program nodes in the loop structure may include pipelining at least a subset of the plurality of graphical program nodes in the loop structure, thereby generating a pipeline inside the loop structure, where the pipeline has an associated pipeline depth resulting in a corresponding latency between each input of the loop structure and corresponding output of the loop structure. An example of such an implementation is illustrated in FIG. 9.

As FIG. 9 shows, in this embodiment, the loop structure contains a memory read primitive, denoted by a "glasses" icon, which is wired to an address input node and also to an uninitialized synchronization register (small upward pointing triangle) on the right side of the loop structure. Note that the loop structure also includes an output of this same synchronization register on the left side of the loop structure, which may be used like any other data terminal for logic or display purposes. In the example shown, these various purposes are represented by a data node labeled "Data", which may access the read data on the cycle subsequent to the read operation. Note that in this example, the read operation requires an entire clock cycle because the output of the memory block is registered, thus necessitating the uninitialized synchronization register. Thus, the SRS of FIG. 9 may be considered a single cycle loop with a latency of one.

In one embodiment, if a synchronization register is coupled or wired to a node corresponding to a component with an embedded synchronization register, corresponding flip flops may not be implemented, being obviated by the embedded synchronization register. Thus, in some embodiments, the synchronization register displayed in the graphical program may simply be purely representational objects to make sure that the user realizes outputs for a particular operation are not valid until the next iteration of the loop.

Thus, while usually a synchronization register equals or maps to flip flops, in this case, the flip flops are already included in the component (the memory read block described above) and so the synchronization registers are not needed on the loop boundary (the left and right triangles) when the circuit is generated (e.g., in an FPGA or an application-specific integrated circuit (ASIC)).

Figure 10A:
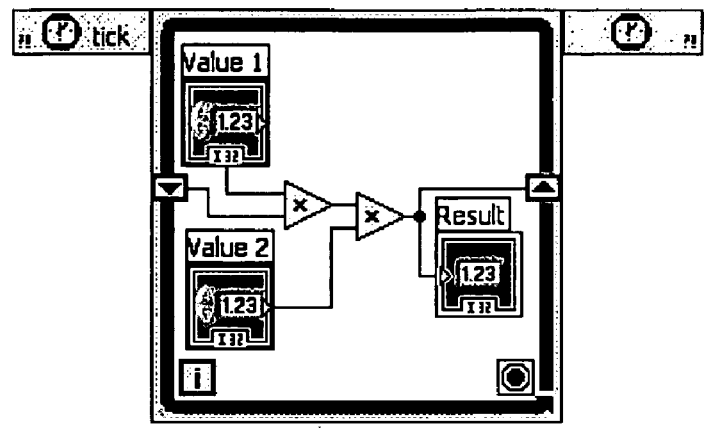
FIG. 10A illustrates a loop structure with pipelined logic, according to one embodiment.

Although the example of FIG. 9 includes only one embedded synchronization register, it should be noted that in other embodiments, for example, those with more pipeline stages (depth greater than one), a plurality of embedded synchronization registers may be used and accommodated. For example, N pipeline stages generally requires N embedded synchronization registers FIGS. 10A and 10B—Multi-Cycle Loops Although the above examples describe single cycle synchronous reactive systems, where the time to execute the logic between the registers/flip flops and propagate the signal from the input register to the output registers must be less than one clock period, in other embodiments, the synchronous reactive systems may require more than one clock cycle to execute an iteration. For example, FIG. 10A illustrates a graphical program where two 32 bit multipliers cascade together. If a clock frequency of 40 MHz is assumed, giving a clock period of 25 ns requirement, the logic may not be executable under this time constraint.

Thus, in some embodiments, the loop structure may be configured to facilitate multi-cycle loops, i.e., N-cycle loops where each iteration of the loop is constrained to N clock cycles or less. In other words, the loop structure may be configured to allow N clock cycles for logic delay and propagation, and so only enable the flip flops (and/or synchronization registers) for execution every N cycles. For example, the loop structure of FIG. 10 may be configured to allow a 2-cycle path, and to the enable for the synchronization register and the controls/indicators may include a circuit to only enable them every 2 clock cycles. Thus, in one embodiment, the loop structure may comprise an N-cycle loop, where, in being operable to execute in a synchronous manner, the loop structure is operable to iterate every N clock cycles, where N is greater than one.

Figure 10B:
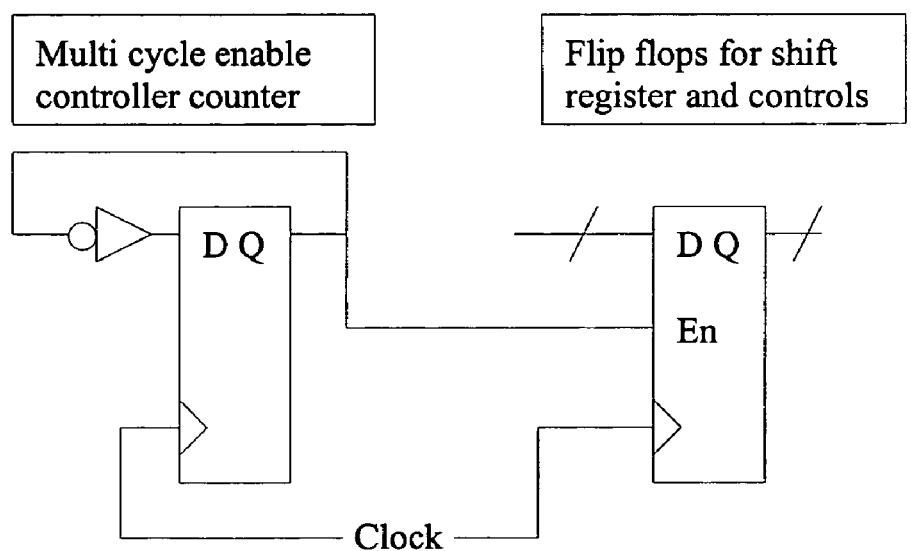
FIG. 10B illustrates a schematic of a multi-cycle synchronous reactive system, according to one embodiment.

FIG. 10B illustrates one embodiment of a schematic for an N-cycle SRS, although it is noted that no application logic is included, but rather, only operation elements implementing the synchronous reactivity of the circuit. As FIG. 10B shows, a single clock signal drives two components, a D flip flop on the left and a dependent D flip flop on the right, arranged in series. Note that each path in the circuit is assumed to be a single cycle path. As shown, the left D flip flop functions as a multi-cycle enable controller counter, which, similar to the D flip flop of FIG. 6A, produces an output that is one half the frequency of the clock signal. This stepped down frequency is then provided to the dependent D flip flop at right as an enable signal operating at one half the clock frequency. As indicated, this dependent D flip flop may include flip flops for a synchronization register and one or more controls.

Thus, in some embodiments, the loop structure may facilitate N-cycle loops, i.e., may implement a multi-cycle synchronous reactive system. More specifically, in some embodiments, synchronization registers (and an inverter) may serve to enable controls and/or indicators included in the graphical program every N cycles, where the value of N is configurable, e.g., via a GUI.

Timing Analysis

In prior art development environments, timing analysis of a program to be deployed onto a programmable hardware element (e.g., an FPGA) is performed by a compiler (at compile time), e.g., to determine whether the logic to be deployed can be successfully implemented on the specified target hardware. For example, in one embodiment, the loop structure may be configured to iterate every N cycles, where N is greater than or equal to 1. The graphical program may be analyzed to determine whether the plurality of graphical program nodes in the loop structure are executable in N cycles, and if the plurality of graphical program nodes in the loop structure are not executable in N cycles, an error message may be output. In one embodiment of the present invention, this analysis may be performed at edit time of the graphical program, i.e., during program development. Thus, in the event that the analysis indicates a problem, the user/developer may quickly modify the program accordingly, thereby improving the efficiency of the development cycle.

As described in U.S. patent application Ser. No. 10/869,572, in some embodiments, a second model of computation or dataflow diagram type may reside inside a first type of dataflow diagram. For example, in one embodiment of a small components test loop (SCTL) application, the second model of computation may be a synchronous/reactive model of computation, where operations are given a certain amount of time to react, and if this constraint holds, the rest of the system appears synchronous. Within the asynchronous part of the system, the diagram may be free to execute in any order, and therefore no logic may be required to enforce a processing order of the elements or nodes. In SCTL the synchronous reaction time is preferably constrained to be one clock cycle, and therefore hardware techniques and tools may be used to compute if the synchronous constraint holds. In other embodiments, the period may be longer, i.e. multiple cycles, which may serve as a good model for some user interaction loops. Given this constraint, the only checks that may be required are whether the diagram can execute within the specified period, or when the looping terminates.

Figure 11:
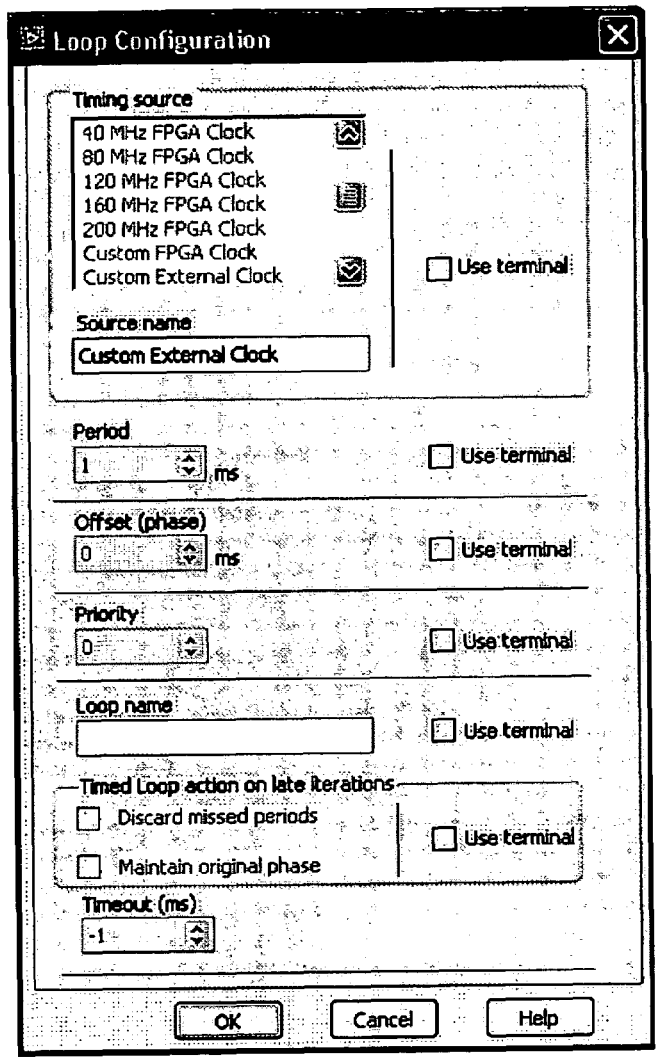
FIG. 11 illustrates a graphical user interface for specifying loop structures with multiple clock domains, according to one embodiment.

FIG. 11—Synchronous Reactive Systems with Multiple Clock Domains

Each of the synchronous reactive systems described above operates in accordance with a single respective clock. Thus, in the case of single cycle loops, the contained logic must execute within that clock's period. However, in some applications, there may be portions of the system that are independent, and can thus run at different rates. For example, as mentioned above, an application may implement or include multiple independent SRSs, each of which may operate according to a different timing source or clock with its own corresponding frequency or rate. Thus, as noted above, in some embodiments, the user may specify a plurality of loop structures and respective pluralities of graphical program nodes in the loop structures for inclusion in the graphical program. Additionally, in one embodiment, user input specifying a respective timing source for each loop structure in the graphical program may be received, e.g., to a GUI. In response to this input, each respective timing source may be associated with each of the loop structures, where each of the loop structures is then operable to execute iteratively in accordance with the associated timing source.

In one embodiment, the user may further configure these various clocks and rates for the loop structures, e.g., via a GUI, an example of which is presented in FIG. 11 and described below. It should be noted, however, that the GUIs presented and described herein are intended to be exemplary only, and are not intended to limit the GUIs to any particular form, function, or appearance. In various embodiments, the GUI functionality may be implemented using any of various GUI elements and techniques as desired, including, for example, menus, dialogs, controls and indicators, data entry fields, and so forth.

FIG. 11 illustrates an exemplary embodiment of a GUI for configuring a loop structure implementing a synchronous reactive system with multiple clock domains. As FIG. 11 shows, in this embodiment, the GUI may include fields for specifying a variety of configuration parameters for the loop structure, or for each of a number of loop structures included in an application, i.e., in a graphical program. For example, as shown at the top of the GUI, a timing source for the loop may be selected from a plurality of available clocks presented in a timing source list box, and the selected source name displayed in a source name field.

Also shown are fields for specifying such timing/clock parameters as period, offset, and priority, e.g., for custom clock specification. Thus, in one embodiment, the user may select a "custom clock" from the timing source, and then specify these parameters for the clock. Note that if a predefined clock is selected, e.g., via the timing source list described above, some or all of these fields may present default or previously specified values, and may be grayed out to indicate that they are not modifiable. For example, if a 200 MHz FPGA clock is selected, the period field may display a grayed out value of 5 ns (the reciprocal of the frequency).

As FIG. 11 also shows, a loop name field may be included whereby the user may specify a name for the loop being configured, e.g., for later reference. Additionally, in the embodiment shown, the user may specify how to handle late iterations, i.e., what to do if the logic in the loop has not completed in the allotted time period.

In another embodiment, the loop structure included in the graphical program (including the first plurality of graphical program nodes) may operate according to one timing source or clock, and the graphical program may also include graphical program nodes (that are not included in the loop structure) that operate according to a second, different, timing source or clock. Thus, in one embodiment, input specifying a first clock for the loop structure may be received, and the loop structure configured to receive clock signals from the specified first clock, where the loop structure is then operable to execute synchronously in accordance with the specified first clock, and where the graphical program includes a second plurality of graphical program nodes configured to execute in accordance with a second clock, where the second clock has a different frequency from that of the first clock. Similarly there may be any number of independent timing sources or clocks in the system.

Figure 12:
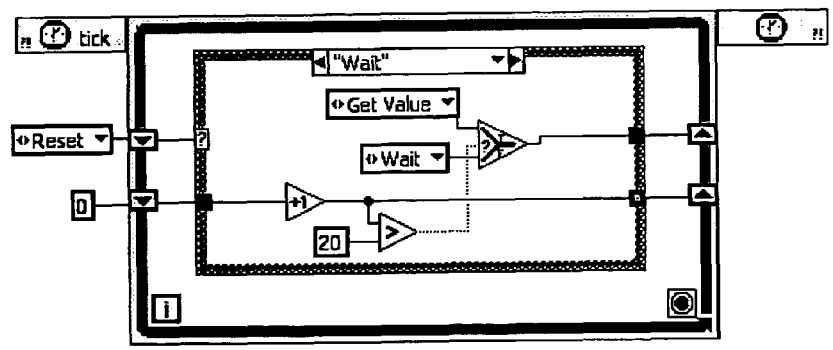
FIG. 12 illustrates a single cycle loop structure implementing a state machine, according to one embodiment.

FIG. 12—State Machines

State machines may also be implemented in embodiments of the single cycle loop structure (in a graphical program) in a manner analogous to implementing a state machine in a hardware description language. FIG. 12 illustrates one embodiment of such a single cycle loop structure, where possible transitions between states are evaluated every clock cycle. In the example shown, the current state of the system is held in a state register (several flip flops). As FIG. 12 shows, in this embodiment, the loop structure includes a case structure, also referred to as a switch/case structure, for managing states and transitions between states. As shown, the state machine is currently in a 'Wait' state. The case structure preferably executes every clock cycle and increments a counter. After 20 cycles, the state register transitions to a 'Get Value' state. It should be noted that while the example state machine shown is based on a single cycle loop, in other embodiments, N-cycle loop structures may also be used to implement state machines. It should be further noted that the state machine shown is meant to be exemplary only, and is not intended to limit the state machines to any particular form, function, states, or transitions.

Thus, in one embodiment, the loop structure and the plurality of graphical program nodes may implement a state machine comprising a plurality of states and a plurality of state transitions, where transitions between states are evaluated every iteration of the loop structure, and where a current state of the state machine is stored in a state register comprised in the loop structure.

In one embodiment, the methods described herein may be used in handling asynchronous events in a time-triggered system as described in U.S. patent application Ser. No. 10/316,365 titled "Deterministically Handling Asynchronous Events in a Time Triggered System," filed Dec. 11, 2002, whose inventors are James J. Truchard and Brian Keith Odom, incorporated by reference above.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for implementing a synchronous reactive system in a graphical program, the method comprising:
   including a loop structure in the graphical program in response to first user input, wherein the loop structure is operable to execute iteratively in a synchronous manner, and wherein the loop structure is operable to store state information for a current iteration and to provide the state information for use in a next iteration of the loop; and
   including a plurality of graphical program nodes in the loop structure in response to second user input;
   wherein, during execution of the graphical program, for each iteration, the loop structure is operable to execute the plurality of graphical program nodes in the loop structure using stored state information from an immediately previous iteration, wherein the loop structure performs each iteration subject to a time constraint, and wherein the loop structure executes the plurality of graphical program nodes in a synchronous reactive manner.

2. The method of claim 1,
   wherein the loop structure comprises at least one synchronization register, comprising an input and an output; and
   wherein, in said loop structure being operable to store and provide the state information, the input to the synchronization register is operable to store the state information, and the output of the synchronization register is operable to provide the state information.

3. The method of claim 2, further comprising:
   executing the graphical program, wherein said executing comprises:
   executing the loop structure in an iterative manner until a stopping condition obtains.

4. The method of claim 3, wherein said executing the loop structure comprises:
   for each iteration,
      the output of the synchronization register providing the state information for the immediately previous iteration for use in the current iteration; and
      the input to the synchronization register storing the state information for the current iteration for use in the next iteration.

5. The method of claim 4,
   wherein the loop structure corresponds to a synchronous reactive hardware circuit; and
   wherein a single bit synchronization register corresponds to a flip flop comprised in the synchronous reactive hardware circuit, and wherein a multi-bit synchronization register corresponds to a bank of flip flops comprised in the synchronous reactive hardware circuit.

6. The method of claim 4, wherein the loop structure comprises combinatorial logic which calculates the state information to be stored in the synchronization register to be used for the next loop iteration.

7. The method of claim 1, wherein the at least one synchronization register is implemented in one or more of:
   hardware; and
   software.

8. The method of claim 1, wherein the loop structure comprises a single-cycle timed loop, and wherein in being operable to execute in a synchronous manner, the loop structure is operable to iterate each clock cycle.

9. The method of claim 1, wherein the loop structure comprises an N-cycle loop, and wherein in being operable to execute in a synchronous manner, the loop structure is operable to iterate every N clock cycles, wherein N is greater than one.

10. The method of claim 1, wherein said including the plurality of graphical program nodes in the loop structure comprises pipelining at least a subset of the plurality of graphical program nodes in the loop structure, thereby generating a pipeline inside the loop structure, wherein the pipeline has an associated pipeline depth, resulting in a corresponding latency between each input of the loop structure and corresponding output of the loop structure.

11. The method of claim 1, the method further comprising:
   including one or more additional loop structures in the graphical program in response to third user input, wherein the one or more additional loop structures are each operable to execute iteratively in a synchronous manner, and wherein the one or more additional loop structures are each operable to store state information for a current iteration and to provide the state information for use in a next iteration of the loop; and
   including a respective plurality of graphical program nodes in each of the one or more additional loop structures in response to fourth user input;
   wherein, during execution of the graphical program, for each iteration, each of the one or more additional loop structures is operable to execute the respective plurality of graphical program nodes in the loop structure using stored state information from an immediately previous iteration, and wherein each of the one or more additional loop structures performs each iteration subject to a respective time constraint.

12. The method of claim 11, further comprising:
receiving user input specifying a respective timing source for each of the loop structure and each of the one or more additional loop structures in the graphical program; and
associating each respective timing source with each of the loop structure and each of the one or more additional loop structures, wherein each of the loop structure and each of the one or more additional loop structures is then operable to execute iteratively in accordance with the associated timing source.

13. The method of claim 12, wherein each of the timing sources comprises a respective clock with a respective frequency.

14. The method of claim 11, wherein at least a subset of the one or more additional loop structures comprise nested loops.

15. The method of claim 1, wherein, in being operable to execute in a synchronous manner, the loop structure is operable to receive an input and to provide an output each iteration.

16. The method of claim 15, wherein in being operable to receive an input and to provide an output each iteration, the loop structure is operable to receive the input and to provide the output on a single clock edge.

17. The method of claim 1, further comprising:
receiving input specifying a first clock for the loop structure; and
configuring the loop structure to receive clock signals from the specified first clock, wherein the loop structure is then operable to execute synchronously in accordance with the specified first clock.

18. The method of claim 17, wherein the graphical program includes a second plurality of graphical program nodes configured to execute in accordance with a second clock, wherein the second clock has a different frequency from that of the first clock.

19. The method of claim 1, the method further comprising:
configuring the loop structure to iterate every N cycles, wherein N is greater or equal to 1;
analyzing the graphical program to determine whether the plurality of graphical program nodes in the loop structure are executable in N cycles; and
if the plurality of graphical program nodes in the loop structure are not executable in N cycles, outputting an error message.

20. The method of claim 19, wherein said analyzing the graphical program is performed at edit time of the graphical program.

21. The method of claim 1,
wherein the loop structure and the plurality of graphical program nodes implements a state machine comprising a plurality of states and a plurality of state transitions;
wherein transitions between states are evaluated every iteration of the loop structure; and
wherein a current state of the state machine is stored in a synchronization register comprised in the loop structure.

22. The method of claim 1, further comprising:
displaying a graphical user interface (GUI) for creating and configuring the graphical program, wherein said first user input and said second user input are received to the GUI.

23. The method of claim 1,
wherein the graphical program comprises a plurality of interconnected nodes that visually indicate functionality of the graphical program.

24. The method of claim 1, wherein said second user input comprises second user input arranging the plurality of nodes on a display, and interconnecting the plurality of nodes.

25. The method of claim 1,
wherein the graphical program comprises a block diagram portion and a user interface portion.

26. The method of claim 25,
wherein, during execution of the graphical program, the user interface is displayed on a display of a first computer system and the block diagram executes on a second computer system.

27. The method of claim 1,
wherein the graphical program comprises a graphical data flow program.

28. The method of claim 1,
wherein the graphical program is operable to perform one or more of:
an industrial automation function;
a process control function;
a hardware circuit function;
a test and measurement function; and
a simulation function.

29. The method of claim 1, the method further comprising:
deploying the graphical program to a hardware device for execution.

30. The method of claim 29, wherein the hardware device comprises a programmable hardware element, and wherein said deploying the graphical program to a hardware device for execution comprises:
compiling the graphical program to generate a hardware configuration program; and
deploying the hardware configuration program to the programmable hardware element.

31. A computer-implemented method for implementing a reactive system in a graphical program, the method comprising:
receiving first user input specifying a loop structure for inclusion in the graphical program, wherein the loop structure is operable to execute iteratively, and wherein the loop structure is operable to store state information for a current iteration and to provide the state information for use in a next iteration of the loop;
including the loop structure in the graphical program in response to the first user input;
receiving second user input specifying a plurality of graphical program nodes for inclusion in the graphical program; and
including the plurality of graphical program nodes in the loop structure in response to the second user input;
wherein, during execution of the graphical program, for each iteration, the loop structure is operable to execute the plurality of graphical program nodes in the loop structure using stored state information from an immediately previous iteration, wherein the loop structure performs each iteration subject to a time constraint, and wherein the loop structure executes the plurality of graphical program nodes in a synchronous reactive manner.

32. A system for implementing a synchronous reactive system in a graphical program, the system comprising:
a processor; and
a memory medium, coupled to the processor, wherein the memory medium stores program instructions executable by the processor to:
include a loop structure in the graphical program in response to first user input, wherein the loop structure is operable to execute iteratively in a synchronous manner, and wherein the loop structure is operable to store state information for a current iteration and to provide the state information for use in a next iteration of the loop; and include a plurality of graphical program nodes in the loop structure in response to second user input;

wherein, during execution of the graphical program, for each iteration, the loop structure is operable to execute the plurality of graphical program nodes in the loop structure using stored state information from an immediately previous iteration, wherein the loop structure performs each iteration subject to a time constraint, and wherein the loop structure executes the plurality of graphical program nodes in a synchronous reactive manner.

33. A computer-implemented system for implementing a synchronous reactive system in a graphical program, the system comprising:

means for including a loop structure in the graphical program in response to first user input, wherein the loop structure is operable to execute iteratively in a synchronous manner, and wherein the loop structure is operable to store state information for a current iteration and to provide the state information for use in a next iteration of the loop; and means for including a plurality of graphical program nodes in the loop structure in response to second user input;

wherein, during execution of the graphical program, for each iteration, the loop structure is operable to execute the plurality of graphical program nodes in the loop structure using stored state information from an immediately previous iteration, wherein the loop structure performs each iteration subject to a time constraint, and wherein the loop structure executes the plurality of graphical program nodes in a synchronous reactive manner.

* * * * *